US012688121B2

(12) United States Patent
Kim

(10) Patent No.: US 12,688,121 B2
(45) Date of Patent: Jul. 21, 2026

(54) DATA STORAGE DEVICE FOR UNIFIED MANAGEMENT OF SYSTEM DATA AND METHOD OF OPERATING THE SAME

(71) Applicant: SK hynix Inc., Gyeonggi-do (KR)

(72) Inventor: Se Joong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/955,975

(22) Filed: Nov. 22, 2024

(65) Prior Publication Data

US 2025/0390431 A1     Dec. 25, 2025

(30) Foreign Application Priority Data

Jun. 25, 2024    (KR) ........................ 10-2024-0082927

(51) Int. Cl.
*G06F 12/02* (2006.01)
*G06F 13/16* (2006.01)

(52) U.S. Cl.
CPC ...... *G06F 12/0246* (2013.01); *G06F 12/0292* (2013.01); *G06F 13/1642* (2013.01)

(58) Field of Classification Search
CPC ......... G06F 12/02; G06F 12/14; G06F 12/16; G06F 2123/00; G06F 2212/00; G06F 12/0866; G06F 12/10; G06F 12/0802
See application file for complete search history.

(56) References Cited

U.S. PATENT DOCUMENTS

| | | | | |
|---|---|---|---|---|
| 7,243,207 | B1* | 7/2007 | Prakash ................. | G06F 16/10 |
| | | | | 718/1 |
| 7,574,464 | B2* | 8/2009 | Hitz ...................... | G06F 3/0607 |
| | | | | 711/170 |
| 9,298,578 | B2 | 3/2016 | Kang et al. | |
| 9,678,974 | B2* | 6/2017 | Jayaraman .......... | G06F 16/1748 |
| 10,776,027 | B2* | 9/2020 | Lee ......................... | G06F 3/061 |
| 11,797,191 | B2* | 10/2023 | Yang ...................... | G06F 3/064 |
| 11,875,055 | B2* | 1/2024 | Kim ....................... | G06F 3/064 |
| 2006/0117071 | A1* | 6/2006 | Sobko ................. | G06F 16/1724 |
| 2008/0235483 | A1* | 9/2008 | Bi ........................... | G06F 21/80 |
| | | | | 711/173 |
| 2018/0260319 | A1* | 9/2018 | Thompson .......... | G06F 12/0246 |
| 2020/0081834 | A1* | 3/2020 | Desai .................. | G06F 12/0646 |
| 2022/0004493 | A1* | 1/2022 | Colella ............... | G06F 12/0246 |
| 2022/0113870 | A1* | 4/2022 | Cho ...................... | G06F 12/0246 |
| 2022/0137851 | A1* | 5/2022 | Kim .......................... | H04L 9/32 |
| | | | | 711/154 |

FOREIGN PATENT DOCUMENTS

| | | |
|---|---|---|
| KR | 10-2014-0069659 A | 6/2014 |
| KR | 10-2024-0015829 A | 2/2024 |

* cited by examiner

*Primary Examiner* — Tasnima Matin
(74) *Attorney, Agent, or Firm* — IP & T GROUP LLP

(57) ABSTRACT

A data storage device may include a memory device and a memory controller. The memory controller may allocate a system region. The memory controller may control the memory device to store system data in the system region without distinguishing between the plurality of memory regions in the system region based on a type of the system data. Therefore, the memory controller may randomly store the system data in the system region without allocating system region based on the type of system data.

15 Claims, 9 Drawing Sheets

| INDEX | SYSTEM VPN | SYSTEM PPN |
|---|---|---|
| 0 | 0x0000 | 0x0 |
| 1 | 0x104C | 0x10 |
| 2 | 0x0356 | 0x20 |
| 3 | 0x0008 | 0x30 |
| 4 | 0x0001 | 0xA0 |
| 5 | 0x0F30 | 0x32 |
| ⋮ | ⋮ | ⋮ |
|  |  |  |
|  |  |  |
|  |  |  |
|  |  |  |
|  |  |  |
|  |  |  |
|  |  |  |
|  |  |  |
|  |  |  |
| N-1 |  |  |

ENTRY

MI GROUP_TYPE A

MI GROUP_TYPE B

MI GROUP_TYPE M-1

SYSTEM DATA TYPE A

SYSTEM DATA TYPE B

SYSTEM DATA TYPE M-1

FIG. 9

SYSTEM VPN-1

| | SEQUENCE ID | | | | | | | | TYPE | | | | | SB | | | | WL | | | | | | | | | | DIE | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 10

SYSTEM VPN-2

| UNUSE | | SB | | | | WL | | | | | | | | | | UNUSE | | SB | | | | WL | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

DATA STORAGE DEVICE FOR UNIFIED MANAGEMENT OF SYSTEM DATA AND METHOD OF OPERATING THE SAME

CROSS-REFERENCES TO RELATED APPLICATION

The present application claims priority under 35 U.S.C. § 119(a) to Korean patent application number 10-2024-0082927 on Jun. 25, 2024 which is incorporated herein by reference in its entirety.

BACKGROUND

1. Technical Field

Embodiments of the present disclosure relate to a data storage device, and more specifically, to a data storage device configured to efficiently manage system data and methods of operating the data storage device.

2. Related Art

A data storage device may use, as a storage media, a nonvolatile memory device such as a flash memory device. The data storage device may generate and manage system data to optimize performance and ensure data integrity.

The data storage device may store system data by allocating some regions of storage media to store the system data in the allocated regions.

To increase durability, performance and reliability of the data storage device, sufficient system data may be reserved. A size of the system data may increase with a capacity of the storage medium or a management unit.

Therefore, it is necessary to manage a storage area of user data so that the user data is not lost due to the area occupied by system data.

SUMMARY

Embodiments of the present disclosure may provide a data storage device configured to efficiently manage a storage space of system data.

Embodiments of the present disclosure may also provide a method of operating the storage device of system data.

According to an embodiment of the present disclosure, there may be provided a data storage device. The data storage device may include a memory device and a memory controller. The memory controller may allocate, as a system region, a plurality of memory regions of the memory device. The memory controller may control the memory device to store the system data in the system region without distinguishing between the plurality of memory regions in the system region based on a type of the system data.

According to another embodiment of the present disclosure, there may be provided a data storage device. The data storage device may include a memory device and a memory controller. A plurality of memory regions of the memory device may be allocated as a system region. The memory controller may control the memory device. The memory controller may generate a mapping table, which may be a set of mapping information groups, each mapping information group including a number of entries determined per type of system data. The memory controller may generate context data related to the mapping information group by a type of the system data. The memory controller may store a virtual address, which may be generated in response to a new system data storage event, in an entry among entries in the mapping table, which is determined based on the context data. The memory controller may control the memory device to store the system data in the system region without distinction between the plurality of memory regions. The memory controller may associate the virtual address with a physical address of the system region in which the system data may be stored.

According to still another embodiment of the present disclosure, there may be provided a method of operating a data storage device. The data storage device may include a memory device and a memory controller configured to control the memory device. The memory controller may allocate, as a system region, a plurality of memory regions of the memory device. The memory controller may control the memory device to store system data in the system region without distinguishing between the plurality of memory regions in the system region.

According to the embodiments, the occupied space of the system data may be reduced by operating the region allocated for storing the system data without distinguishing between the types of the system data. This enables the freed up space to be used for storing user data.

BRIEF DESCRIPTION OF THE DRAWINGS

The above and other embodiments, features and advantages of the subject matter of the present disclosure will be more easily understood from the following detailed description taken in conjunction with the accompanying drawings, in which:

FIG. 3 is a block diagram illustrating a concept for managing a storage medium in accordance with embodiments of the present disclosure;

FIGS. 5 and 6 are diagrams illustrating a concept for managing system data in accordance with embodiments of the present disclosure;

FIG. 7 is a diagram illustrating a system data mapping table in accordance with embodiments of the present disclosure;

FIG. 9 is a diagram illustrating a virtual address format of system data in accordance with embodiments of the present disclosure; and FIG. 10 is a diagram illustrating a virtual address format of system data in accordance with embodiments of the present disclosure.

DETAILED DESCRIPTION

Various embodiments of the present disclosure will be described in greater detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

The embodiments of the present disclosure are described herein with reference to cross-section and/or plan illustrations of various embodiments of the present disclosure. However, the embodiments of the present disclosure should not be construed as limiting the inventive concept. Although a few embodiments of the present disclosure will be shown and described, it will be appreciated by those of ordinary skill in the art that changes may be made in these embodiments without departing from the principles and spirit of the present disclosure.

Figure 1:
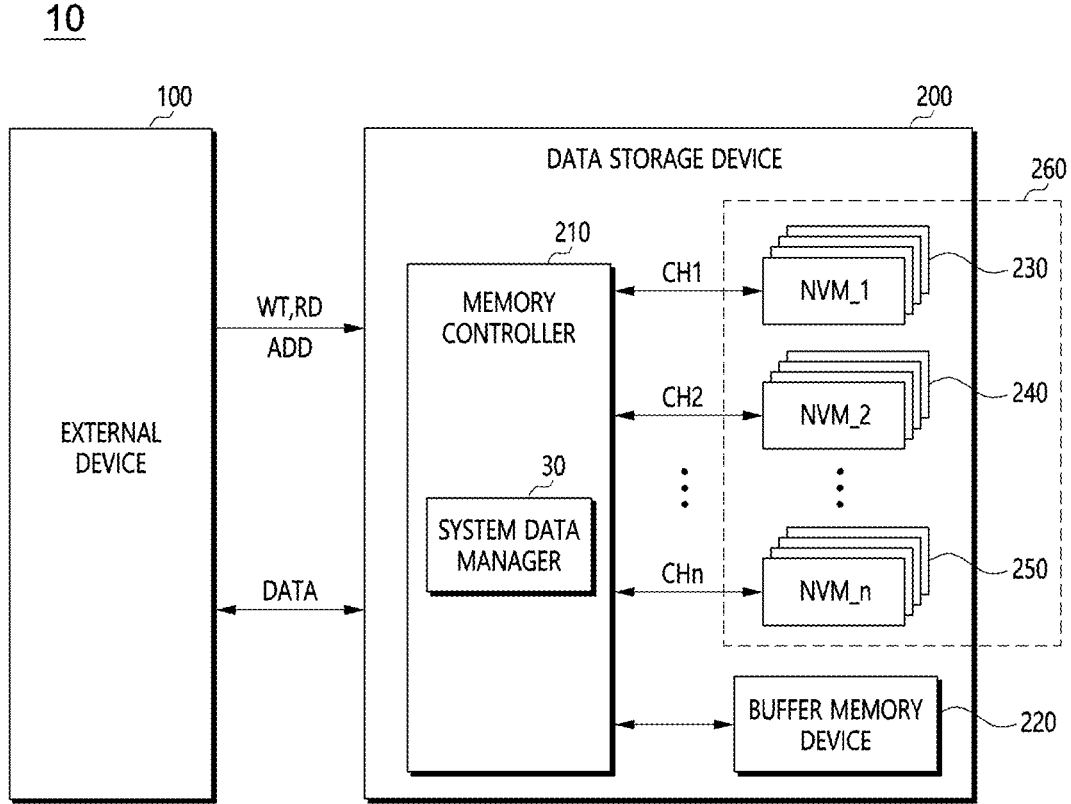
FIG. 1 is a block diagram illustrating a data processing system in accordance with embodiments of the present disclosure.

FIG. 1 is a block diagram illustrating a data processing system 10 in accordance with embodiments of the present disclosure.

Referring to FIG. 1, the data processing system 10 may include an external device 100 and a data storage device 200.

The external device 100 may include at least one processor. The external device 100 may be a processor itself, or an electronic device or system that includes a processor.

The data storage device 200 may include a memory controller 210, a buffer memory device 220 and a storage medium 260. The storage medium 260 may include a plurality of non-volatile memory devices 230, 240 and 250.

The external device 100 may transmit, to the data storage device 200, a write request including a write command WT, an address ADD and write data DATA to store the write data in the data storage device 200. In response, the memory controller 210 of the data storage device 200 may control the storage medium 260 to program the write data.

The external device 100 may transmit, to the data storage device 200, a read request including a read command RD and an address ADD to read data from the data storage device 200. The memory controller 210 of the data storage device 200 may control the storage medium 260 to read data corresponding to the read request from the storage medium 260. The memory controller 210 may then transmit the read data to the external device 100.

As such, the data storage device 200 may read data from the storage medium 260 and write data in the storage medium 260 in response to the read request and the write request from the external device 100. Further, the data storage device 200 may perform internal operations. The internal operations may be performed independent of requests from the external device 100, and may include housekeeping operations such as a garbage collection, a wear-leveling, and a read reclaim to efficiently use storage space on the storage medium 260 or to ensure the reliability of data stored on the storage medium 260.

The buffer memory device 220 may temporarily store data transmitted between the external device 100 and the data storage device 200 during write or read operations.

The memory controller 210 may provide an interface between the external device 100 and the data storage device 200.

The memory controller 210 may include a system data manager 30.

The memory controller 210 may generate and manage system data to optimize performance of the data storage device 200 and ensure integrity of the data. The system data may include metadata.

The system data may be loaded into the buffer memory device 220 and may be used and updated for managing operations of the data storage device 200. The system data may be stored in a region of the storage medium 260, such as the system data region, based on established criteria.

Figure 2:
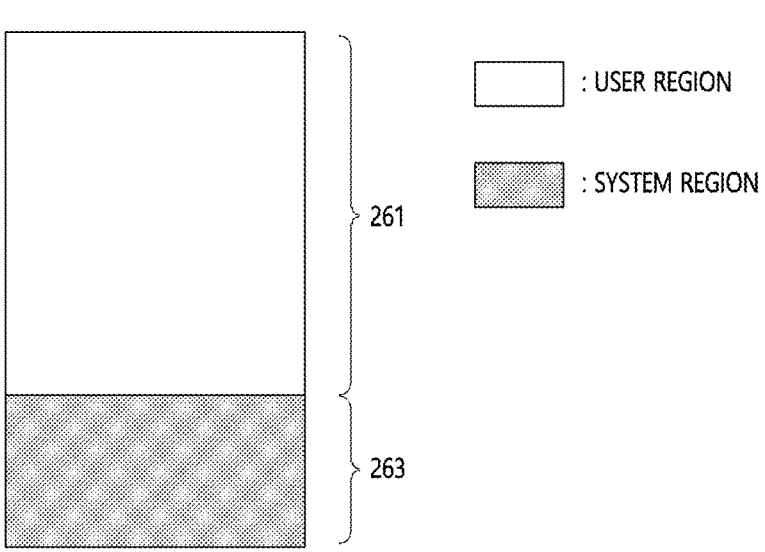
FIG. 2 is a logical diagram illustrating a storage medium in accordance with embodiments of the present disclosure.

FIG. 2 is a logical diagram illustrating a storage medium in accordance with embodiments of the present disclosure.

Referring to FIG. 2, the storage medium 260 may include a user region 261 and a system region 263.

The user region 261 may store data provided by the external device 100 or may store data computed or generated internally by the data storage device 200 at a request of the external device 100.

The system region 263 may store system data including metadata.

The metadata may include a first type of metadata, a second type of metadata, and a third type of metadata. The first type of metadata may include management information of the data storage device 200. The second type of metadata may include operational history information of the data storage device 200. The third type of metadata may include information for debugging the data magnetic device 200.

The first type of metadata may include map data, which includes mapping information between the logical address used by the external device 100 and the physical address assigned to the storage medium 260, read/write/erase counts, and bad block information, which are necessary to perform internal management operations of the storage medium 260 (e.g., the wear leveling, and the garbage collection).

A unit metadata of the first type of metadata may have a set first size. A total size of the first type of metadata may be determined by a capacity of the storage medium 260.

The second type of metadata may include trim instruction information, snapshots of the metadata and management information about the metadata.

A unit metadata of the second type of metadata may have a set second size. A total size of the second type of metadata may be determined by a number of the unit metadata of the second type of metadata that may be stored over a set period of time.

The third type of metadata may include debugging data, which is status information of the data storage device 200 collected when the data storage device 200 experiences an error or failure.

The unit metadata of the third type of metadata may have a set third size. A total size of the third type of metadata may be determined by a number of copies to maintain.

Referring back to FIG. 1, the system data manager 30 may allocate a portion of the storage medium 260 as the system region 263 in proportion to the total size of all system data. As will be described later with reference to FIG. 3, the storage medium 260 may include a plurality of blocks as memory regions. Each of the user region 261 and the system region 263 may include a plurality of blocks.

The system data manager 30 may store any type of system data in the system region 263, without distinguishing between the plurality of memory regions in the system region 263 by type of system data. That is, the system data manager 30 may randomly store the system data in the system region without allocating system region based on the type of system data.

Figure 3:
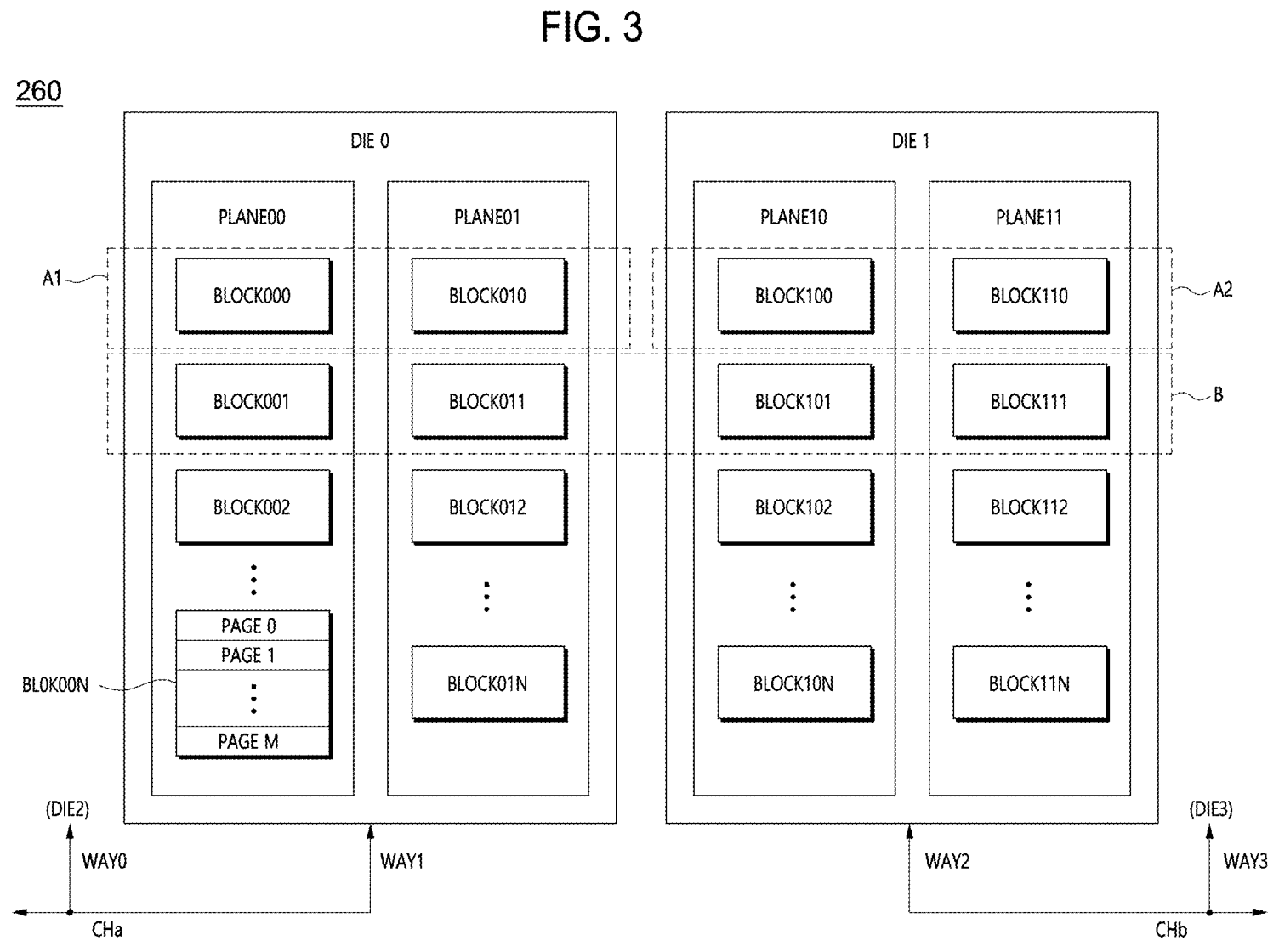

FIG. 3 is a block diagram illustrating a concept for managing a storage medium including a non-volatile memory device 260 in accordance with embodiments of the present disclosure.

Referring to FIG. 3, the non-volatile memory device 260 may include multiple dies, e.g., four dies DIE0, DIE1, DIE2 and DIE3. Each die DIE0, and DIE1 may include multiple planes. For example, the die DIE0 includes two planes PLACE00 and PLANE01, and the die DIE1 includes two planes PLANE10 and PLANE11. Each plane may include a plurality of memory blocks. For example, the plane PLANE00 includes memory blocks BLOCK000-BLOCK00N, the plane PLANE01 includes memory blocks BLOCK010-BLOCK01N, the plane PLANE10 includes memory blocks BLOCK100-BLOCK10N, and the plane PLANE11 includes memory blocks BLOCK110-BLOCK11N. Each of the memory blocks BLOCK000-BLOCK00N, BLOCK010-BLOCK01N, BLOCK100~BLOCK10N and BLOCK110-BLOCK11N may include a plurality of pages PAGE 0-PAGE M.

The non-volatile memory device 260 may input and output data via channels CHa and CHb. Each channel CHa and CHb may input and output data in an interleaving manner. Each channel CHa and CHb may branch into a plurality of paths WAY0 and WAY1 configured to share the channel CHa, and WAY2 and WAY3 configured to share the channel CHb, respectively. The plurality of paths WAY0, WAY1, WAY2 and WAY3 may be connected to each dies DIE2, DIE0, DIE1 and DIE3, respectively.

While FIG. 3 illustrates an example in which each of the dies DIE0 and DIE2 and the dies DIE1 and DIE3 is connected to a branched path WAY1, WAY0, WAY2 and WAY3 on independent channels CHa and CHb, respectively, however the configuration of the memory device 120 is not limited to thereto.

Referring back to FIG. 1, the memory controller 210 may form a superblock by grouping simultaneously selectable blocks among the plurality of memory blocks, as shown in FIG. 3.

The superblock may include a combination of simultaneously selectable blocks, such as a first type superblock A1 and A2 or a second type superblock B. Each of the superblocks A1 and A2 includes a grouping of memory blocks included on different planes in the same die. The superblock B includes a grouping of memory blocks included on different planes in the plurality of dies.

In some embodiments, the memory regions allocated to the user region 261 and the system region 263 may operate as a superblock unit.

The system data may include the first to third metadata described above.

The unit metadata of the first type of metadata may have a first size. A storage amount of the first type of metadata may be predetermined. In some embodiments, a number of super blocks corresponding to (the total size of the first type of metadata/the size of the unit super block) may be required to store the first type of metadata.

The amount of the second type of metadata may be unlimited. In some embodiments, a number of super blocks corresponding to [(((the size of unit meta data of the second type of metadata)×(the number of unit metadata of the second type of metadata to be stored for a set period of time))/the size of unit super block] may be required to store the second type of metadata.

The total size of the third type of metadata may be determined by the number of copies to maintain. In some embodiments, a number of super blocks corresponding to [(((the size of unit meta data of the third type of metadata)× the number of copies)/the size of the unit super block] may be required to store the third type of metadata.

The system data manager 30 may allocate the system region 263 based on the total size of the system data determined by the type of system data including metadata, and the operational units (e.g., memory blocks, super blocks, etc.) of the storage medium 260.

In some embodiments, the system data manager 30 may allocate the system region 263 with a size corresponding to the total size of the system data.

In some embodiments, the system data manager 30 may allocate the system region 263 with a size, which corresponds to the addition of a set margin to the total size of the system data. The margin may serve as an amount of space required for movement of the system data in the system region 263.

Figure 4:
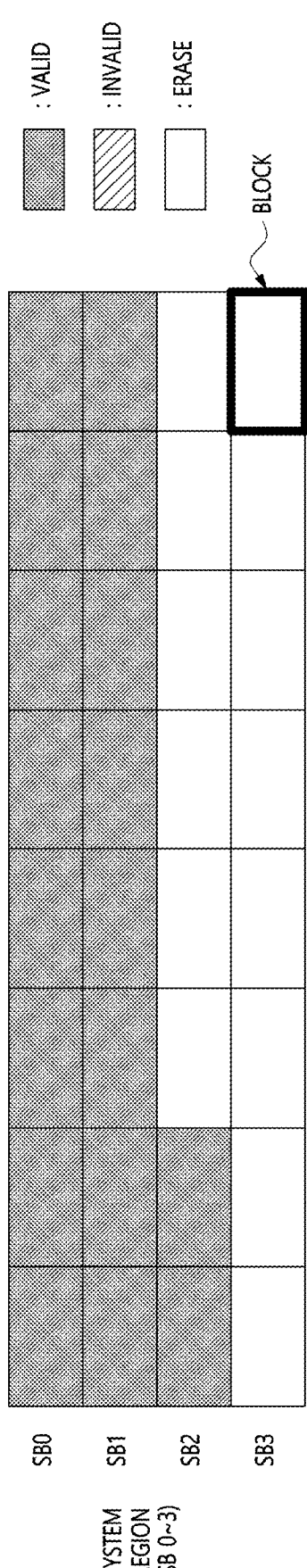
FIG. 4 is a diagram illustrating a system data storage region in accordance with embodiments of the present disclosure.

FIG. 4 is a diagram illustrating a system data storage region 263 in accordance with embodiments of the present disclosure.

Referring to FIG. 4, the system region 263 may include a plurality of super blocks SB0-SB3. Each of the super blocks SB0-SB3 may include a plurality of memory blocks.

The system data manager 30 may store system data in the system region 263 without distinguishing between the types of system data. Thus, the plurality of super blocks SB0-SB3 in the system region 263 may operate as independent regions that might not be logically distinct.

The system data stored in the system region 263 may be valid system data until the system data may be updated.

Figure 5:
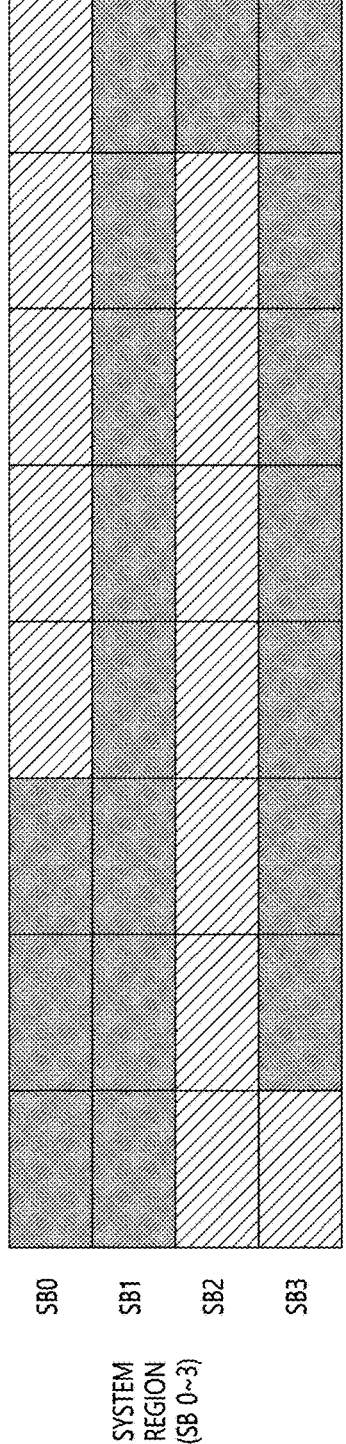
Figure 6:
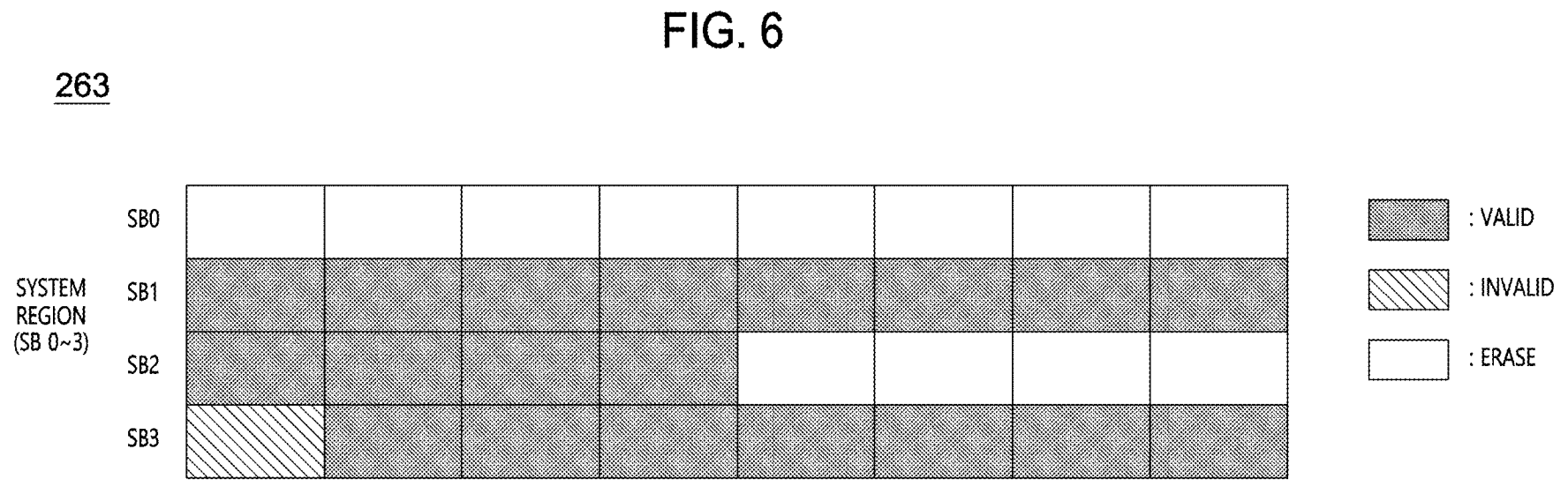

FIGS. 5 and 6 are diagrams illustrating a concept for managing system data in accordance with embodiments of the present disclosure.

A flash memory device may not be over-written or in-place updated. The flash memory device may have different read, write and erase units. Therefore, the data to be changed may not be overwritten in the memory region where the data before the change may be stored, but may be stored in a different memory region than the one where the data before the change may be stored.

As the data storage device 200 is used, the system data may be deleted or changed, at least in part. The system data manager 30 may control the storage medium 260 to invalidate previous system data which is before deleting or changing it. The system data manager 30 may write new system data which is after change to another memory region in the system region 263.

Referring to FIG. 5, the system region 263 may include a mixture of invalid system data INVALID and valid system data VALID.

To ensure that the memory region occupied by the invalid system data is not wasted, the system data manager 30 may collect, among the system region 263, information on the region in which the invalid system data is stored.

Referring to FIG. 6, the system data manager 30 may select at least one sacrificial superblock and a target super-block based on a size of the valid system data stored in the plurality of memory regions included in the system region 263, such as the plurality of superblocks SB0-SB3. The system data manager 30 may move the valid system data stored in the at least one sacrificial superblock to the target superblock. The system data manager 30 may then erase the sacrificial superblock.

For example, the system data manager 30 may select the first and second super blocks SB0 and SB2 as the sacrificial super blocks. The system data manage 30 may select the second super block SB2 as the target super block. The system data manager 30 may move the valid system data of the first and second sacrificial super blocks SB0 and SB2 as shown in FIG. 5 to the target super block SB2 as shown in FIG. 6. The system data manager 30 may then erase the sacrificial super block SB0.

The system data manager 30 may change the block management information to include the erased first sacrificial super block SB0 in the user region 261.

FIG. 7 is a diagram illustrating a system data mapping table in accordance with embodiments of the present disclosure.

Since all system data is stored in the system region 263 without distinction of type, the system data manager 30 may manage, as a system data mapping table 310, mapping information between virtual addresses utilized by the memory controller 210 and physical addresses assigned to the system region 263.

Referring to FIG. 7, the system data mapping table 310 may include mapping information groups MI Group_TYPE A, MI Group_TYPE B, . . . , MI Group_TYPE M-1 assigned per system data type SYSTEM DATA TYPE A, SYSTEM DATA TYPE B, . . . , SYSTEM DATA TYPE M-1. Each mapping information groups MI Group_TYPE A, MI Group_TYPE B, . . . , MI Group_TYPE M-1 may include at least one Entry. Each entry may include a virtual address SYSTEM VPN and a physical address SYSTEM PPN for the unit system data and may be separated by an Index INDEX.

Since the mapping information of system data is managed in the mapping information groups MI Group_TYPE A, MI Group_TYPE B, . . . , MI Group_TYPE M-1 in accordance with the types of the system data, the physical address of the system data may be derived from the corresponding mapping information group to read a specific type of the system data.

In response to an event in which new system data for which no mapping information exists in the mapping information table 310 is detected and the detected system data is to be stored in the system region 263, the system data manager 30 may generate the virtual address SYSTEM VPN corresponding to the new system data and determine an entry to store the mapping information for the new system data. The generated virtual address SYSTEM VPN may then be stored in the determined entry. As the new system data is stored in the system region 263, the system data manager 30 may update the mapping information table 310 so that the virtual address SYSTEM VPN is associated with the physical address SYSTEM PPN of the system region 263 where the new system data is stored.

As described in FIGS. 5 and 6, the mapping information table 310 may also be updated when the storage region that stored the invalid system data INVALID is reclaimed from the system region 263.

To determine entries configured to store mapping information for new system data, the system data manager 30 may manage context data associated with the mapping information groups MI Group_TYPE A, MI Group_TYPE B, . . . , MI Group_TYPE M-1 assigned to each type of the system data SYSTEM DATA TYPE A, SYSTEM DATA TYPE B, . . . , SYSTEM DATA TYPE M-1.

Figure 8:
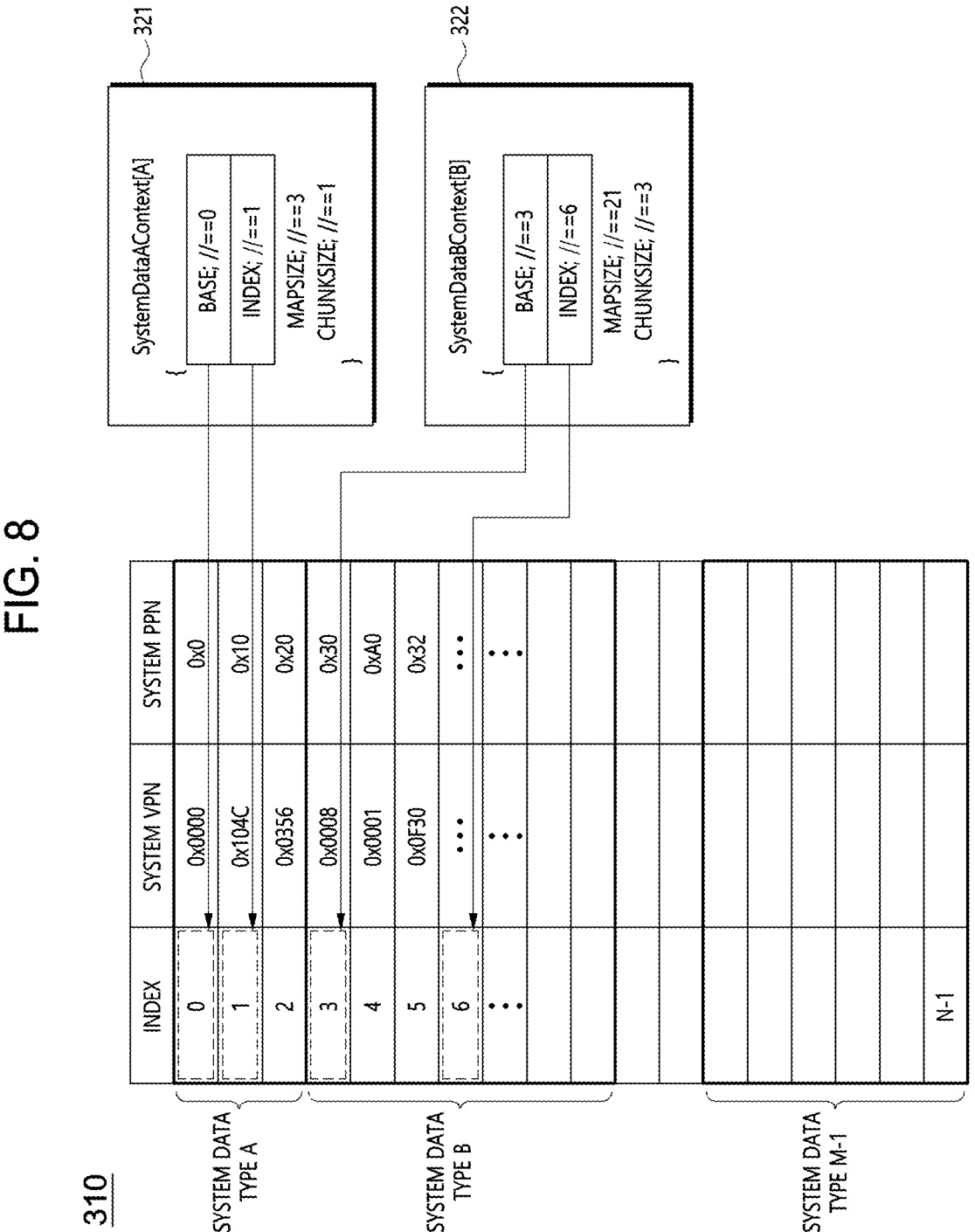
FIG. 8 is a diagram illustrating context data in accordance with embodiments of the present disclosure.

FIG. 8 is a diagram illustrating context data in accordance with embodiments of the present disclosure.

Referring to FIG. 8, the context data 321 and 322 for each type of system data SYSTEM DATA TYPE A, SYSTEM DATA TYPE B, . . . , SYSTEM DATA TYPE M-1 may include the base index BASE of the associated mapping information group MI Group_TYPE A, MI Group_ TYPE B, . . . , MI Group_TYPE M-1, the index INDEX of the entry to be assigned to the new system data, the size MAPSIZE of the mapping information group MI Group_TYPE A, MI Group_TYPE B, . . . , MI Group_TYPE M-1, and the size CHUNKSIZE of the unit system data according to the type of the associated system data.

Referring to the context data (SystemDataAContext[A]) 321 of the system data of type A, it may be noted that the base index BASE is 0, the index INDEX of the entry to be assigned to the new system data of type A is 1, the size MAPSIZE of the corresponding mapping information group MI Group_TYPE A is 3, and the size CHUNKSIZE of the unit system data of type A is 1.

Referring to the context data (SystemDataBContext[B]) 322 of the system data of type B, it may be noted that the base index BASE is 3, the index INDEX of the entry to be assigned to the new system data of type B is 6, the size MAPSIZE of the corresponding mapping information group MI Group_TYPE B is 21, and the size CHUNKSIZE of the unit system data of type B is 3.

The size of the mapping information table may be finite, and the system data manager 30 may allocate entries within the mapping information groups MI Group_TYPE A, MI Group_TYPE B, . . . , MI Group_TYPE M-1 for each type of system data in a round-robin manner to manage mapping information for new system data.

FIGS. 9 and 10 are diagrams illustrating a virtual address format for system data in accordance with embodiments of the present disclosure.

Referring to FIG. 9, a virtual address format SYSTEM VPN-1 of system data may include die information DIE, word line information WL, superblock information SB, type information TYPE and sequence information SEQUENCE ID of a corresponding unit system data in the system data of that type.

Referring to FIG. 10, the virtual address format of system data SYSTEM VPN-2 may include word line information WL and superblock information SB.

When the format SYSTEM VPN-2 as shown in FIG. 10 is used, the number of virtual addresses can be doubly managed using the same size of data as that of FIG. 9.

As such, the present technology may store all system data in the system region 263 without distinguishing between types of system data, and manage the storage location for each type of system data as a mapping information table including virtual addresses.

Since the memory region is not dedicated for each type of system data, an empty memory region may be acquired as a result of aggregating valid system data. The acquired free memory region may be used as a user region, thereby increasing the efficiency of utilization of the data storage device 200.

As such, those skilled in the art to which the present disclosure belongs will understand that the embodiments of the present disclosure may be practiced in other specific forms without altering their technical idea or essential features. It should therefore be understood that the embodiments described above are illustrative in all respects and are not intended to be limiting. The scope of the invention is indicated by the following patent claims rather than by the detailed description above, and all modifications or variations derived from the meaning and scope of the claims and their equivalents are to be construed as being within the scope of the present disclosure. Furthermore, the embodiments may be combined to form additional embodiments.

What is claimed is:

1. A data storage device comprising:
   a memory device; and
   a memory controller configured to allocate, as a system region, a plurality of memory regions of the memory device, and control the memory device to store system data in the system region without distinguishing between the plurality of memory regions in the system region based on a type of the system data, wherein the memory controller generates a mapping information table which maps a virtual address per unit system data with a physical address of the system region, the mapping information table comprises a mapping information group assigned by the type of the system data, the mapping information group comprises at least one entry, and the memory controller generates context data associated with the mapping information group by the type of the system data.

2. The data storage device of claim 1, wherein the memory controller determines a size of the system data in accordance with the type of the system data, and allocates the system region corresponding to the determined size.

3. The data storage device of claim 1, wherein the memory controller determines a size of the system data based on the type of the system data, and allocates the system region based on the determined size and a set margin.

4. The data storage device of claim 1, wherein the entry comprises an index, the virtual address and the physical address, and wherein the context data comprises a base index of the mapping information group, an index of the entry to be assigned to new system data, a size of the mapping information group, and a size of the unit system data of the corresponding type of the system data.

5. The data storage device of claim 4, wherein the entry in the mapping information group is allocated in a round-robin manner.

6. The data storage device of claim 1, wherein the memory controller moves valid system data of a first memory region of the plurality of memory regions to a second memory region, and then erases the first memory region.

7. The data storage device of claim 6, wherein the memory controller controls the memory device to store data, received from an external device, in the erased first memory region.

8. A data storage device comprising:

a memory device including a plurality of memory regions, which is allocated as a system region; and a memory controller for controlling the memory device and configured to:

generate a mapping table, which is a set of mapping information groups, each mapping information group including a determined number of entries per type of system data, generate context data related to the mapping information group by a type of the system data, store a virtual address generated in response to a new system data storage event in an entry among entries in the mapping table, which is determined based on the context data, control the memory device to store the system data in the system region without distinction between the plurality of memory regions, and associate the virtual address with a physical address of the system region in which the system data is stored.

9. The data storage device of claim 8, wherein the memory controller moves valid system data from a first memory region of the plurality of memory regions to a second memory region, and then stores data, which is received from an external device, in the first memory region.

10. A method of operating a data storage device including a memory device and a memory controller configured to control the memory device, the method comprising:

allocating, by the memory controller, as a system region, a plurality of memory regions of the memory device; and controlling, by the memory controller, the memory device to store system data in the system region without distinguishing between the plurality of memory regions including the system region, wherein the memory controller generates a mapping information table which maps a virtual address per unit system data with a physical address of the system region, the mapping information table comprises a mapping information group assigned by a type of the system data, the mapping information group comprises at least one entry, and the memory controller generates context data associated with the mapping information group by the type of the system data.

11. The method of claim 10, wherein allocating the plurality of regions comprises;

determining a total size of the system data based on the type of the system data; and allocating the system region corresponding to the determined size.

12. The method of claim 10, wherein allocating the plurality of regions comprises:

determining a size of the system data based on the type of the system data; and allocating the system region based on the determined size and a set margin.

13. The method of claim 10, wherein the entry comprises an index, the virtual address and the physical address, and wherein the context data comprises a base index of the mapping information group, an index of an entry to be assigned to new system data, a size of the mapping information group, and a size of a unit system data of a corresponding type of the system data.

14. The method of claim 10, further comprising:

controlling, by the memory controller, the memory device to move valid system data of a first memory region of the plurality of memory regions to a second memory region, and then erase the first memory region.

15. The method of claim 14, further comprising controlling, by the memory controller, the memory device to store data of an external device in the erased first memory region.

* * * * *